(12) United States Patent
Shen et al.

(10) Patent No.: US 9,869,422 B2
(45) Date of Patent: Jan. 16, 2018

(54) METHOD FOR PREPARING BULK C—ALN COMPOSITE AEROGEL WITH HIGH STRENGTH AND HIGH TEMPERATURE RESISTANCE

(71) Applicant: NANJING TECH UNIVERSITY, Nanjing, Jiangsu (CN)

(72) Inventors: Xiaodong Shen, Nanjing (CN); Ya Zhong, Nanjing (CN); Sheng Cui, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 422 days.

(21) Appl. No.: 14/406,685

(22) PCT Filed: Jun. 17, 2013

(86) PCT No.: PCT/CN2013/077009
§ 371 (c)(1),
(2) Date: Dec. 9, 2014

(87) PCT Pub. No.: WO2013/189247
PCT Pub. Date: Dec. 27, 2013

(65) Prior Publication Data
US 2015/0108389 A1    Apr. 23, 2015

(30) Foreign Application Priority Data
Jun. 18, 2012  (CN) .......................... 2012 1 0201085

(51) Int. Cl.
*B01J 13/00*     (2006.01)
*F16L 59/02*     (2006.01)
(Continued)

(52) U.S. Cl.
CPC ......... *F16L 59/028* (2013.01); *B01J 13/0091* (2013.01); *C01B 21/072* (2013.01);
(Continued)

(58) Field of Classification Search
CPC ... F16L 59/028; B01J 13/0091; C01B 21/072; C01B 32/00; C04B 35/52; C04B 35/581;
(Continued)

(56) References Cited

FOREIGN PATENT DOCUMENTS

CN     1149030 A     5/1997
CN     1403409 A     3/2003
(Continued)

OTHER PUBLICATIONS

Machine Translation of Publ. No. CN 102302917 (A), published Jan. 4, 2012, European patent Office, obtained online @ http://ep.espacenet.com/?locale=EN_ep (Downloaded Jan. 9, 2017).*
(Continued)

*Primary Examiner* — Daniel S Metzmaier
(74) *Attorney, Agent, or Firm* — Oliff PLC

(57) ABSTRACT

Provided is a method for preparing a bulk C—AlN composite aerogel with high strength and high temperature resistance, which includes: evenly stirring aluminum chloride crystals, water, ethanol and epoxy propane, to obtain a clear aluminum oxide sol solution, then adding formaldehyde and resorcinol to the solution and performing even stirring, to obtain an RF/$Al_2O_3$ composite aerogel sol solution, leaving the gel to stand, treating the sample by using a supercritical $CO_2$ drying method, and finally heat-treating the sample at a high temperature under the condition of nitrogen, to obtain the bulk C—AlN composite aerogel with high strength and high temperature resistance. The composite aerogel prepared by using this method has advantages of high integrity, high specific surface area, intact structure, low heat conductivity, low density, and high strength.

7 Claims, 1 Drawing Sheet

(51) Int. Cl.
  *C01B 21/072* (2006.01)
  *C04B 35/52* (2006.01)
  *C04B 35/581* (2006.01)
  *C01B 32/00* (2017.01)

(52) U.S. Cl.
  CPC .............. *C01B 32/00* (2017.08); *C04B 35/52* (2013.01); *C04B 35/581* (2013.01); *C04B 2235/3865* (2013.01); *C04B 2235/422* (2013.01); *C04B 2235/444* (2013.01); *C04B 2235/48* (2013.01)

(58) Field of Classification Search
  CPC ...... C04B 2235/3865; C04B 2235/422; C04B 2235/48; C04B 2235/444
  See application file for complete search history.

(56) References Cited

FOREIGN PATENT DOCUMENTS

| | | |
|---|---|---|
| CN | 102302917 A | 1/2012 |
| CN | 102343285 A | 2/2012 |
| CN | 102716700 A | 10/2012 |

OTHER PUBLICATIONS

Machine Translation of Publ. No. CN 1403409 (A1), published Mar. 19, 2003, European patent Office, obtained online @ http://ep.espacenet.com/?locale=EN_ep (Downloaded Jan. 9, 2017).*
Sep. 26, 2013 International Search Report issued in International Application No. PCT/CN2013/077009.

* cited by examiner

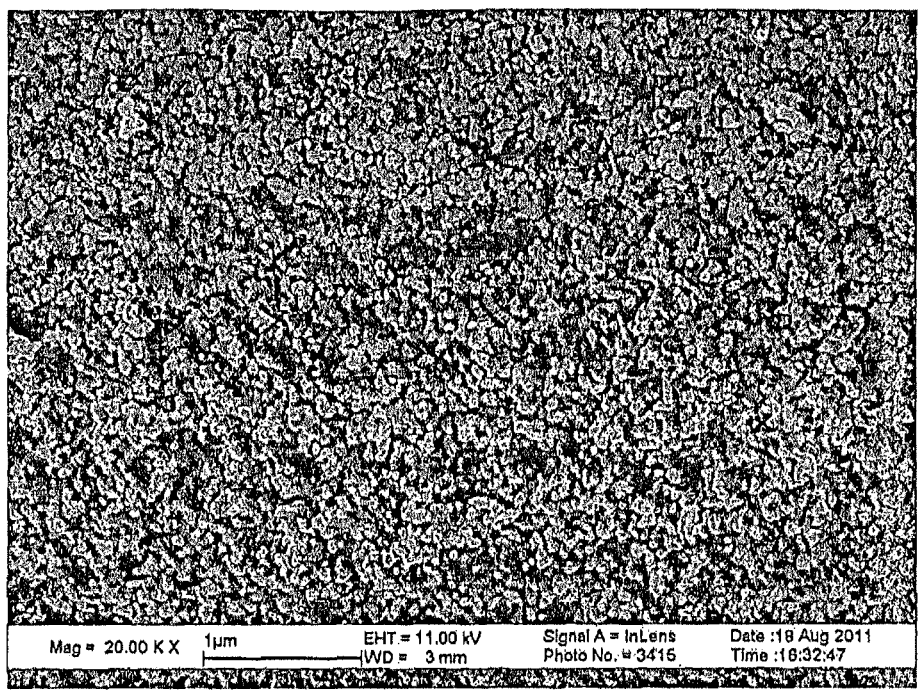

METHOD FOR PREPARING BULK C—AlN COMPOSITE AEROGEL WITH HIGH STRENGTH AND HIGH TEMPERATURE RESISTANCE

BACKGROUND

Technical Field

The present invention belongs to the technical field of preparation of inorganic nanomaterials characterized by high temperature insulation, and relates to a method for preparing a bulk C—AlN composite aerogel with high strength, and in particular, to a method for preparing a bulk C—AlN composite aerogel with high strength by using a supercritical $CO_2$ method.

Related Art

Aerogel is a novel porous material having a nanoporous network structure formed by agglutination of colloidal particles or polymer molecules. An aerogel material has a large specific surface area, high porosity, low refractive index, low density, and high adsorbability, and has particular properties in thermotics, optics, electrics and acoustics. Especially in thermotics, the nanoporous structure of aerogel can effectively inhibit solid-state heat conduction and gas heat transfer. As a result, aerogel has excellent thermal insulation properties, and is presently known as a solid-state material having the lowest heat conductivity. Therefore, as a lightweight thermal insulation material, aerogel has board application prospects in the field of aerospace, chemical industry, metallurgy, energy-efficient buildings.

Although the aerogel material has many excellent properties, the brittleness problem and the high temperature resistant performance (greater than 1000° C.) greatly restrict its working conditions. Aluminum nitride (AlN) belongs to diamond nitrides, is stable at a temperature up to 2200° C., and has a high strength at room temperature, and the strength slowly decreases with the increase of the temperature. The AlN material is also an electrical insulator, has good dielectric properties, and is probably used as an electrical component. A C—AlN composite aerogel maintains the original excellent properties of aerogel, and the overall strength and high temperature resistant performance of aerogel are greatly improved due to doping of the AlN material, thereby further broadening the application of the aerogel material.

SUMMARY

In order to overcome the disadvantages of low strength and poor high temperature thermostability of currently studied composite aerogel based on silicon, aluminum, and the like, the present invention provides a bulk C—AlN composite aerogel with high strength and resistance of a high temperature of 1500° C. or above.

The technical solution of the present invention is: a method for preparing a bulk C—AlN composite aerogel with high strength and high temperature resistance is provided, which specifically includes the following steps:

(1) evenly stirring aluminum chloride crystals, distilled water, anhydrous ethanol and epoxy propane, to obtain a clear aluminum oxide sol solution;

(2) adding formaldehyde (referred to as F for short) and resorcinol (referred to as R for short) to the aluminum oxide sol solution obtained in Step (1) and performing even stirring, to obtain an $RF/Al_2O_3$ composite aerogel sol solution;

(3) pouring the $RF/Al_2O_3$ composite aerogel sol solution in Step (2) into a mold for reaction to form a gel;

(4) adding an aging solution to the gel obtained in Step (3) for aging replacement;

(5) placing the wet gel after aging replacement in Step (4) in an oven at 60° C. to 75° C., aging the wet gel for 5 to 10 d, and then taking the wet gel out for drying; and (6) heat-treating the sample after drying in Step (5) under the condition of nitrogen, to obtain the bulk C—AlN composite aerogel with high strength and high temperature resistance;

where in Step (1), a molar ratio of aluminum chloride crystals, distilled water, anhydrous ethanol and epoxy propane is 1:(50 to 70):(20 to 30):(8 to 13); and in Step (2), a molar ratio of aluminum chloride crystals:resorcinol:formaldehyde is (1 to 5):1:2.

Preferably, in Step (3), time for reaction to form a gel is 2 to 10 h. Preferably, in Step (4), the aging solution is at least one of anhydrous ethanol and deionized water; and the number of times of replacement of the aging solution in the process of aging replacement is 3 to 5, and replacement time is 12 to 24 h each time. Preferably, in Step (5), a supercritical $CO_2$ drying method is used, where in the supercritical $CO_2$ drying method, $CO_2$ is used for protection, a reaction temperature is 45° C. to 50° C., pressure of a high pressure reactor is controlled at 8 to 12 MPa, and reaction time is 2 to 3 d. Preferably, in Step (6), a heat treatment temperature ranges from 1500° C. to 1700° C., and heat treatment time is 1 h to 10 h.

Beneficial Effects:

1. In the present invention, a bulk $RF/Al_2O_3$ composite aerogel is prepared by using the supercritical drying technology, which is heat-treated at a high temperature, to obtain a bulk C—AlN composite aerogel with high strength and high temperature resistance. First, a wet gel system of $RF/Al_2O_3$ composite aerogel is prepared by using a sol-gel method, a sample with even pores (which can be seen from an SEM photo of a bulk C—AlN composite aerogel with high strength and high temperature resistance prepared in Example 1) is prepared by using the supercritical drying technology, and then the sample is heat-treated at a high temperature, to obtain the bulk C—AlN composite aerogel with high strength and high temperature resistance. The product has a large specific surface area (in an example in which the molar ratio of Al and R is 1:1, the specific surface area is 500 to 600 $m^2/g$), and high strength (in an example in which the molar ratio of Al and C is 1:1, the heat treatment time is 2 h, the density is 0.16 $g/cm^3$, and the compressive strength is up to 4 to 6MPa, which is far greater than that of Si and Al based aerogel and fiber reinforced aerogel). The bulk C—AlN composite aerogel with high strength and high temperature resistance prepared by using this method needs no excessive tedious step, and the preparation process is simple and easy to operate.

2. According to the bulk C—AlN composite aerogel with high strength and high temperature resistance prepared according to the present invention, an inexpensive organic salt is used as an aluminum source and good mechanical performance of a carbon aerogel is combined. Presently, there is no report at home and abroad about preparing an aerogel with an aluminum and carbon based composite. Since the bulk C—AlN composite aerogel with high strength and high temperature resistance has all the properties of aerogel, and most importantly, it has high strength and good high-temperature thermostability, which is unsurpassable to an aerogel prepared by using a conventional method, the present invention is very meaningful, and has better application prospects in various fields.

BRIEF DESCRIPTION OF THE DRAWINGS

The disclosure will become more fully understood from the detailed description given herein below for illustration only, and thus are not limitative of the disclosure, and wherein:

FIG. 1 is an SEM photo of a bulk C—AlN composite aerogel with high strength and high temperature resistance prepared in Example 1.

DETAILED DESCRIPTION

Example 1

Aluminum chloride crystals, resorcinol and formaldehyde are weighted at a molar ratio of 1:1:2 to prepare a bulk C—AlN composite aerogel with high strength and high temperature resistance. First step: 0.1 mol aluminum chloride crystals are weighted and poured into a 500 ml beaker, and then 151.4 ml ethanol (Al/EtOH=1:26), 90 ml deionized water (Al/$H_2O$=1:50) and 63 ml epoxy propane (Al/PO=9) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/$Al_2O_3$ composite aerogel sol solution, which is poured into a mold for gelation. Gelation time at room temperature is about 8 h, and after gelation, ethanol is used as an aging solution to replace impurity ions in the wet gel three times and each time for 24 h. Finally, the wet gel in the mold is placed in an oven at 75° C. and aged at a high temperature for 10 d for full reaction. The RF/$Al_2O_3$ composite wet gel is placed in a high-temperature high-pressure reactor, and the sample is dried by using a supercritical $CO_2$ drying method, where pressure of $CO_2$ is controlled at 10 MPa, a temperature is controlled at 50° C., and supercritical drying time is 48 h. Finally, the sample is heat-treated for 2 h at a high temperature of 1500° C. under the condition of nitrogen, to obtain the bulk C—AlN composite aerogel with high strength and high temperature resistance. It is found from an SEM photo of the prepared bulk C—AlN composite aerogel with high strength and high temperature resistance by characterization that, the specific surface area of the aerogel is 596 $m^2/g$, and the compressive strength is 5.22 MPa.

Example 2

Aluminum chloride crystals, resorcinol and formaldehyde are weighted at a molar ratio of 2:1:2 to prepare a bulk C—AlN composite aerogel with high strength and high temperature resistance. First step: 0.2 mol aluminum chloride crystals are weighted and poured into a 1000 ml beaker, and then 349.9 ml ethanol (Al/EtOH=1:30), 252 ml deionized water (Al/$H_2O$=1:70) and 126 ml epoxy propane (Al/PO=9) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/$Al_2O_3$ composite aerogel sol solution, which is poured into a mold for gelation. Gelation time at room temperature is about 6 h, and after gelation, a mixed solution of ethanol and deionized water is used as an aging solution to replace impurity ions in the wet gel five times and each time for 12 h. Finally, the wet gel in the mold is placed in an oven at 60° C. and aged at a high temperature for 7 d for full reaction. The RF/$Al_2O_3$ composite wet gel is placed in a high-temperature high-pressure reactor, and the sample is dried by using a supercritical $CO_2$ drying method, where pressure of $CO_2$ is controlled at 12 MPa, a temperature is controlled at 45° C., and supercritical drying time is 72 h. Finally, the sample is heat-treated for 1 h at a high temperature of 1650° C. under the protection of argon, to obtain the bulk C—AlN composite aerogel with high strength and high temperature resistance. It is found by characterization that, the specific surface area of the aerogel is 503 $m^2/g$, and the compressive strength is 5.95 MPa.

Example 3

Aluminum chloride crystals, resorcinol and formaldehyde are weighted at a molar ratio of 5:1:2 to prepare a bulk C—AlN composite aerogel with high strength and high temperature resistance. First step: 0.5 mol aluminum chloride crystals are weighted and poured into a 2000 ml beaker, and then 583.16 ml ethanol (Al/EtOH=1:20), 450 ml deionized water (Al/$H_2O$=1:50) and 345 ml epoxy propane (Al/PO=1:10) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/$Al_2O_3$ composite aerogel sol solution, which is poured into a mold for gelation. Gelation time at room temperature is about 2 h, and after gelation, deionized water is used as an aging solution to replace impurity ions in the wet gel three times and each time for 18 h. Finally, the wet gel in the mold is placed in an oven at 65° C. and aged at a high temperature for 5 d for full reaction. The RF/$Al_2O_3$ composite wet gel is placed in a high-temperature high-pressure reactor, and the sample is dried by using a supercritical $CO_2$ drying method, where pressure of $CO_2$ is controlled at 8 MPa, a temperature is controlled at 50° C., and supercritical drying time is 60 h. Finally, the sample is heat-treated for 5 h at a high temperature of 1550° C. under the condition of nitrogen, to obtain the bulk C—AlN composite aerogel with high strength and high temperature resistance. It is found by characterization that, the specific surface area of the aerogel is 526 $m^2/g$, and the compressive strength is 4.14 MPa.

Example 4

Aluminum chloride crystals, resorcinol and formaldehyde are weighted at a molar ratio of 1:1:2 to prepare a bulk C—AlN composite aerogel with high strength and high temperature resistance. First step: 0.1 mol aluminum chloride crystals are weighted and poured into a 500 ml beaker, and then 151 ml ethanol (Al/EtOH=1:26), 126 ml deionized water (Al/$H_2O$=1:70) and 91 ml epoxy propane (Al/PO=1:13) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/Al$_2$O$_3$ composite aerogel sol solution, which is poured into a mold for gelation. Gelation time at room temperature is about 9 h, and after gelation, ethanol is used as an aging solution to replace impurity ions in the wet gel four times and each time for 15 h. Finally, the wet gel in the mold is placed in an oven at 70° C. and aged at a high temperature for 10 d for full reaction. The RF/Al$_2$O$_3$ composite wet gel is placed in a high-temperature high-pressure reactor, and the sample is dried by using a supercritical CO$_2$ drying method, where pressure of CO$_2$ is controlled at 10 MPa, a temperature is controlled at 45° C., and supercritical drying time is 48 h. Finally, the sample is heat-treated for 3 h at a high temperature of 1600° C. under the condition of nitrogen, to obtain the bulk C—AlN composite aerogel with high strength and high temperature resistance. It is found by characterization that, the specific surface area of the aerogel is 555 m$^2$/g, and the compressive strength is 5.17 MPa.

Example 5

Aluminum chloride crystals, resorcinol and formaldehyde are weighted at a molar ratio of 4:1:2 to prepare a bulk C—AlN composite aerogel with high strength and high temperature resistance. First step: 0.4 mol aluminum chloride crystals are weighted and poured into a 2000 ml beaker, and then 699.8 ml ethanol (Al/EtOH=1:30), 504 ml deionized water (Al/H$_2$O=1:70) and 307.9 ml epoxy propane (Al/PO=1:11) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/Al$_2$O$_3$ composite aerogel sol solution, which is poured into a mold for gelation. Gelation time at room temperature is about 7 h, and after gelation, deionized water is used as an aging solution to replace impurity ions in the wet gel four times and each time for 20 h. Finally, the wet gel in the mold is placed in an oven at 70° C. and aged at a high temperature for 10 d for full reaction. The RF/Al$_2$O$_3$ composite wet gel is placed in a high-temperature high-pressure reactor, and the sample is dried by using a supercritical CO$_2$ drying method, where pressure of CO$_2$ is controlled at 11 MPa, a temperature is controlled at 45° C., and supercritical drying time is 60 h. Finally, the sample is heat-treated for 4 h at a high temperature of 1550° C. under the condition of nitrogen, to obtain the bulk C—AlN composite aerogel with high strength and high temperature resistance. It is found by characterization that, the specific surface area of the aerogel is 506 m$^2$/g, and the compressive strength is 4.57 MPa.

Example 6

Aluminum chloride crystals, resorcinol and formaldehyde are weighted at a molar ratio of 2:1:2 to prepare a bulk C—AlN composite aerogel with high strength and high temperature resistance. First step: 0.2 mol aluminum chloride crystals are weighted and poured into a 1000 ml beaker, and then 233.27 ml ethanol (Al/EtOH=1:20), 216 ml deionized water (Al/H$_2$O=1:60) and 84 ml epoxy propane (Al/H$_2$O=1:12) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/Al$_2$O$_3$ composite aerogel sol solution, which is poured into a mold for gelation. Gelation time at room temperature is about 5 h, and after gelation, a mixed solution of ethanol and deionized water is used as an aging solution to replace impurity ions in the wet gel four times and each time for 18 h. Finally, the wet gel in the mold is placed in an oven at 60° C. and aged at a high temperature for 7 d for full reaction. The RF/Al$_2$O$_3$ composite wet gel is placed in a high-temperature high-pressure reactor, and the sample is dried by using a supercritical CO$_2$ drying method, where pressure of CO$_2$ is controlled at 10 MPa, a temperature is controlled at 50° C., and supercritical drying time is 48 h. Finally, the sample is heat-treated for 5 h at a high temperature of 1700° C. under the condition of nitrogen, to obtain the bulk C—AlN composite aerogel with high strength and high temperature resistance. It is found by characterization that, the specific surface area of the aerogel is 525 m$^2$/g, and the compressive strength is 588 MPa.

Example 7

Aluminum chloride crystals, resorcinol and formaldehyde are weighted at a molar ratio of 3:1:2 to prepare a bulk C—AlN composite aerogel with high strength and high temperature resistance. First step: 0.3 mol aluminum chloride crystals are weighted and poured into a 1000 ml beaker, and then 454.2 ml ethanol (Al/EtOH=1:26), 324 ml deionized water (Al/H2O=1:60) and 207 ml epoxy propane (Al/PO=1:10) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/Al$_2$O$_3$ composite aerogel sol solution, which is poured into a mold for gelation. Gelation time at room temperature is about 6 h, and after gelation, ethanol is used as an aging solution to replace impurity ions in the wet gel five times and each time for 12 h. Finally, the wet gel in the mold is placed in an oven at 70° C. and aged at a high temperature for 10 d for full reaction. The RF/Al$_2$O$_3$ composite wet gel is placed in a high-temperature high-pressure reactor, and the sample is dried by using a supercritical CO$_2$ drying method, where pressure of CO$_2$ is controlled at 8 MPa, a temperature is controlled at 50° C., and supercritical drying time is 72 h. Finally, the sample is heat-treated for 5 h at a high temperature of 1600° C. under the condition of nitrogen, to obtain a bulk carbon-supported Al$_2$O$_3$—Al$_4$C$_3$ composite aerogel. It is found by characterization that, the specific surface area of the aerogel is 505 m$^2$/g, and the compressive strength is 5.18 MPa.

Example 8

Aluminum chloride crystals, resorcinol and formaldehyde are weighted at a molar ratio of 3:1:1 to prepare a bulk C—AlN composite aerogel with high strength and high temperature resistance. First step: 0.3 mol aluminum chloride crystals are weighted and poured into a 1000 ml beaker, and then 524.85 ml ethanol (Al/EtOH=1:30), 270 ml deionized water (Al/H$_2$O=1:50) and 252 ml epoxy propane (Al/PO=1:12) are added to the beaker, which are fully and evenly stirred, to obtain a clear aluminum oxide sol solution. Second step: 0.1 mol resorcinol (white needle-like crystals) and 15 ml formaldehyde are added to the aluminum oxide sol solution in the first step, which are fully and evenly stirred until the solution completely turns into a clear reddish sol solution, so as to obtain an RF/Al$_2$O$_3$ composite aerogel sol solution, which is poured into a mold for gelation. Gelation time at room temperature is about 4 h, and after gelation, deionized water is used as an aging solution to replace impurity ions in the wet gel three times and each time for 20 h. Finally, the wet gel in the mold is placed in an oven at 75° C. and aged at a high temperature for 5 d for full reaction. The RF/Al$_2$O$_3$ composite wet gel is placed in a high-temperature high-pressure reactor, and the sample is dried by using a supercritical CO$_2$ drying method, where pressure of CO$_2$ is controlled at 10 MPa, a temperature is controlled at 45° C., and supercritical drying time is 60 h. Finally, the sample is heat-treated for 10 h at a high temperature of 1650° C. under the condition of nitrogen, to obtain the bulk C—AlN composite aerogel with high strength and high temperature resistance. It is found by characterization that, the specific surface area of the aerogel is 426 m$^2$/g, and compressive strength is 5.31 MPa.

What is claimed is:

1. A method for preparing a bulk C—AlN composite aerogel with high strength and high temperature resistance, the method comprising the following steps:
   (1) evenly stirring aluminum chloride crystals, distilled water, anhydrous ethanol and epoxy propane, to obtain a clear aluminum oxide sol solution;
   (2) adding formaldehyde (referred to as F for short) and resorcinol (referred to as R for short) to the aluminum oxide sol solution obtained in Step (1) and performing even stirring, to obtain an RF/Al$_2$O$_3$ composite aerogel sol solution;
   (3) pouring the RF/Al$_2$O$_3$ composite aerogel sol solution in Step (2) into a mold for reaction to form a gel;
   (4) adding at least one of anhydrous ethanol and deionized water to the gel obtained in Step (3) for aging replacement;
   (5) placing the wet gel after aging replacement in Step (4) in an oven at 60° C. to 75° C., aging the wet gel for 5 to 10 d, and then drying the wet gel using a supercritical CO$_2$ drying method; and
   (6) heat-treating the sample after drying in Step (5) under the condition of nitrogen, to obtain the bulk C—AlN composite aerogel with high strength and high temperature resistance;
   wherein:
   in Step (1), a molar ratio of aluminum chloride crystals, distilled water, anhydrous ethanol and epoxy propane is 1:(50 to 70):(20 to 30):(8 to 13);
   in Step (2), a molar ratio of aluminum chloride crystals: resorcinol:formaldehyde is (1 to 5):1:2;
   in the supercritical CO$_2$ drying method of Step (5), CO$_2$ is used for protection, a reaction temperature is 45° C. to 50° C., pressure of a high pressure reactor is controlled at 8 to 12 MPa, and reaction time is 2 to 3 d; and
   in Step (6), a heat treatment temperature ranges from 1500° C. to 1700° C., and heat treatment time is 1 h to 10 h.

2. The preparation method according to claim 1, wherein in Step (3), time for reaction to form a gel is 2 to 10 h.

3. The preparation method according to claim 1, wherein in Step (4), the number of times of replacement of the anhydrous ethanol and/or deionized water in the process of aging replacement is 3 to 5, and replacement time is 12 to 24 h each time.

4. The preparation method according to claim 1, wherein:
   in Step (1), the molar ratio of aluminum chloride crystals, distilled water, anhydrous ethanol and epoxy propane is 1:(50 to 70):(20 to 30):(9 to 13);
   in the supercritical CO$_2$ drying method of Step (5), the pressure of the high pressure reactor is controlled at 8 to 11 MPa; and
   in Step (6), the heat treatment time is 2 h to 5 h.

5. The preparation method according to claim 1, wherein:
   in Step (3), time for reaction to form a gel is 2 to 10 h; and
   in Step (4), the number of times of replacement of the anhydrous ethanol and/or deionized water in the process of aging replacement is 3 to 5, and replacement time is 12 to 24 h each time.

6. The preparation method according to claim 4, wherein:
   in Step (3), time for reaction to form a gel is 2 to 10 h; and
   in Step (4), the number of times of replacement of the anhydrous ethanol and/or deionized water in the process of aging replacement is 3 to 5, and replacement time is 12 to 24 h each time.

7. A method for preparing a bulk C—AlN composite aerogel with high strength and high temperature resistance, the method comprising the following steps:
   (1) evenly stirring aluminum chloride crystals, distilled water, anhydrous ethanol and epoxy propane, to obtain a clear aluminum oxide sol solution;
   (2) adding formaldehyde (referred to as F for short) and resorcinol (referred to as R for short) to the aluminum oxide sol solution obtained in Step (1) and performing even stirring, to obtain an RF/Al$_2$O$_3$ composite aerogel sol solution;
   (3) pouring the RF/Al$_2$O$_3$ composite aerogel sol solution in Step (2) into a mold for reaction to form a gel;
   (4) adding at least one of anhydrous ethanol and deionized water to the gel obtained in Step (3) for aging replacement;
   (5) placing the wet gel after aging replacement in Step (4) in an oven at 60° C. to 75° C., aging the wet gel for 5 to 10 d, and then taking the wet gel out for drying; and
   (6) heat-treating the sample after drying in Step (5) under the condition of nitrogen, to obtain the bulk C—AlN composite aerogel with high strength and high temperature resistance;
   wherein:
   in Step (1), a molar ratio of aluminum chloride crystals, distilled water, anhydrous ethanol and epoxy propane is 1:(50 to 70):(20 to 30):(8 to 13); and
   in Step (2), a molar ratio of aluminum chloride crystals: resorcinol:formaldehyde is (3 to 5):1:2..

* * * * *